United States Patent [19]
Mori et al.

[11] Patent Number: 5,278,864
[45] Date of Patent: Jan. 11, 1994

[54] SPREAD SPECTRUM COMMUNICATION DEVICE

[75] Inventors: Masaharu Mori; Motohiro Gochi; Shigeru Takeuchi, all of Tokyo, Japan

[73] Assignee: Clarion Co., Ltd., Tokyo, Japan

[21] Appl. No.: 915,926

[22] Filed: Jul. 17, 1992

[30] Foreign Application Priority Data

Jul. 31, 1991 [JP] Japan .................................. 3-214459

[51] Int. Cl.$^5$ ............................................. H04L 27/30
[52] U.S. Cl. ............................................................. 375/1
[58] Field of Search ............................................. 375/1

[56] References Cited

U.S. PATENT DOCUMENTS

| | | | |
|---|---|---|---|
| 5,048,052 | 9/1991 | Hamatsu et al. | 375/1 |
| 5,105,436 | 4/1992 | Mori et al. | 375/1 |
| 5,115,448 | 5/1992 | Mori | 375/1 |
| 5,132,986 | 7/1992 | Endo et al. | 375/1 |
| 5,144,641 | 9/1992 | Akazawa et al. | 375/1 |
| 5,195,105 | 3/1993 | Hashimoto et al. | 375/1 |

*Primary Examiner*—Gilberto Barrón, Jr.
*Attorney, Agent, or Firm*—Flynn, Thiel, Boutell & Tanis

[57] ABSTRACT

A spread spectrum communication device according to the present invention includes a transmitter and a receiver, and suppresses demodulation errors to a minimum value, even if there exit a plurality of narrow band disturbing signals. In the transmitter, a first PN (pseudo noise) code from a fist PN code generator and a second PN code having a delayed phase coming from a shift register are inputted to a multiplexer and switched according to an exclusive logic sum of data and a disturbing signal. The multiplexer output is modulated by a modulator so that it can be transmitted. In the receiver, a correlation output from a correlator is detected by a detector and a detection output thereof is digitalized by a voltage comparator. A correlation pulse thus obtained is applied to two AND gates. Two time window pulses are each applied to two multiplexers nd are switched by a control signal, the outputs of the multiplexers being respectively applied to these AND gates. Pulses from these AND gates are counted by an up-counter and a down-counter in a demodulating circuit to demodulate the data.

12 Claims, 10 Drawing Sheets

SPREAD SPECTRUM COMMUNICATION DEVICE

FIELD OF THE INVENTION

The present invention relates to a spread spectrum (hereinbelow abbreviated to SS) communication device, and in particular to an improvement for decreasing demodulation errors due to a plurality of narrow band disturbing signals in an SS communication device by the code phase shift keying (hereinbelow abbreviated to CPSK) modulation-demodulation system.

BACKGROUND OF THE INVENTION

The SS communication method has as characteristics that it is resistant against disturbance, noise and fading and it has a signal concealing property and secrecy, and that asynchronous random access is thereby possible, as described in "Spread Spectrum Systems" by R. C. Dixon.

In such an SS modulation communication, the data modulation-demodulation system suitable for this communication method was heretofore a problem to be solved.

For this reason the applicant of the present application has proposed a new data modulation-demodulation method in two older Japanese patent applications Hei 1-29538 and Hei 1-244931. By the data modulation-demodulation method disclosed in the first of the two Japanese patent applications described above, on the transmitter side an SS code is transmitted after having been formed by switching between a plurality of pseudo noise (hereinbelow abbreviated to PN) codes different from each other according to values of data bits, while on the receiver side a surface acoustic wave (hereinbelow abbreviated to SAW) convolver is used as a correlator so that data are demodulated without requiring any synchronization between a PN code included in a received signal and a reference PN code generated within the receiver, as indicated in FIGS. 1 and 2 thereof. The system described in this patent application is so constructed that the reference PN code therein tracks the PN code included in the received signal, as indicated in FIG. 9 thereof. Consequently it is devised so as to always obtain a correlation output. On the other hand, the system disclosed in the latter (Japanese patent application No. Hei 1-244931) of the patent applications described above is an improvement of the system disclosed in the first, in which a pattern matching circuit and a low pass filter are added to the output side of the correlator to reduce influences of noise and disturbance so that detection of the presence or absence of the correlation output is made surer and that the tracking method, by which two PN codes are switched-over at detecting disappearance of the correlation output, can be effected more efficiently.

However, in the latter patent application (i.e. patent application No. Hei 1-244931), since in-loop delay of the tracking loop is increased if the performance of the added circuits is increased, which can give rise to out-tracking, it was difficult to obtain performance higher than a certain degree.

Therefore, the applicant of this application has proposed in the patent application No. Hei 2-331399 an SS communication method and a device capable of demodulating data more surely without using any tracking loop.

By the SS communication method according to the invention in the older patent application described above, on the transmitter side (a) a first PN code train consisting of first PN codes repeated with a predetermined period and a second PN code train having a phase deviated from the phase of the first PN code train by a predetermined value are generated, and (b) an SS modulated output is generated by selecting either one of the first and the second PN code trains according to each bit of the data to be transmitted so that each bit of the data to be transmitted is CPSK-modulated. On the other hand, on the receiver side, (a) a correlation-demodulated output is generated by correlation-demodulating a received input with a third PN code train consisting of PN codes repeated with the predetermined period described above, which are inverted in time with respect to the first PN code stated above, and (b) the correlation-demodulated output described above is CPSK-demodulated. This CPSK demodulation is effected (i) by generating a first time window pulse train consisting of pulses synchronized with the correlation-demodulated output described above and having a period which is equal to a half of the period stated above, by generating a second time window pulse train consisting of pulses deviated by the predetermined phase with respect to the pulse train described previously, and by generating a bit period indicating signal indicating the period of each bit of the data to be transmitted described previously, (ii) by generating a binary converted pulse output obtained by binary-converting the correlation-demodulated output with a predetermined threshold, (iii) by detecting a difference between the number of pulses within the first time window and the number of pulses within the second time window described above in the binary-converted pulse output in the period of each bit, and (iv) by determining the state of each bit, depending on the polarity of the difference described above.

Figure 5:
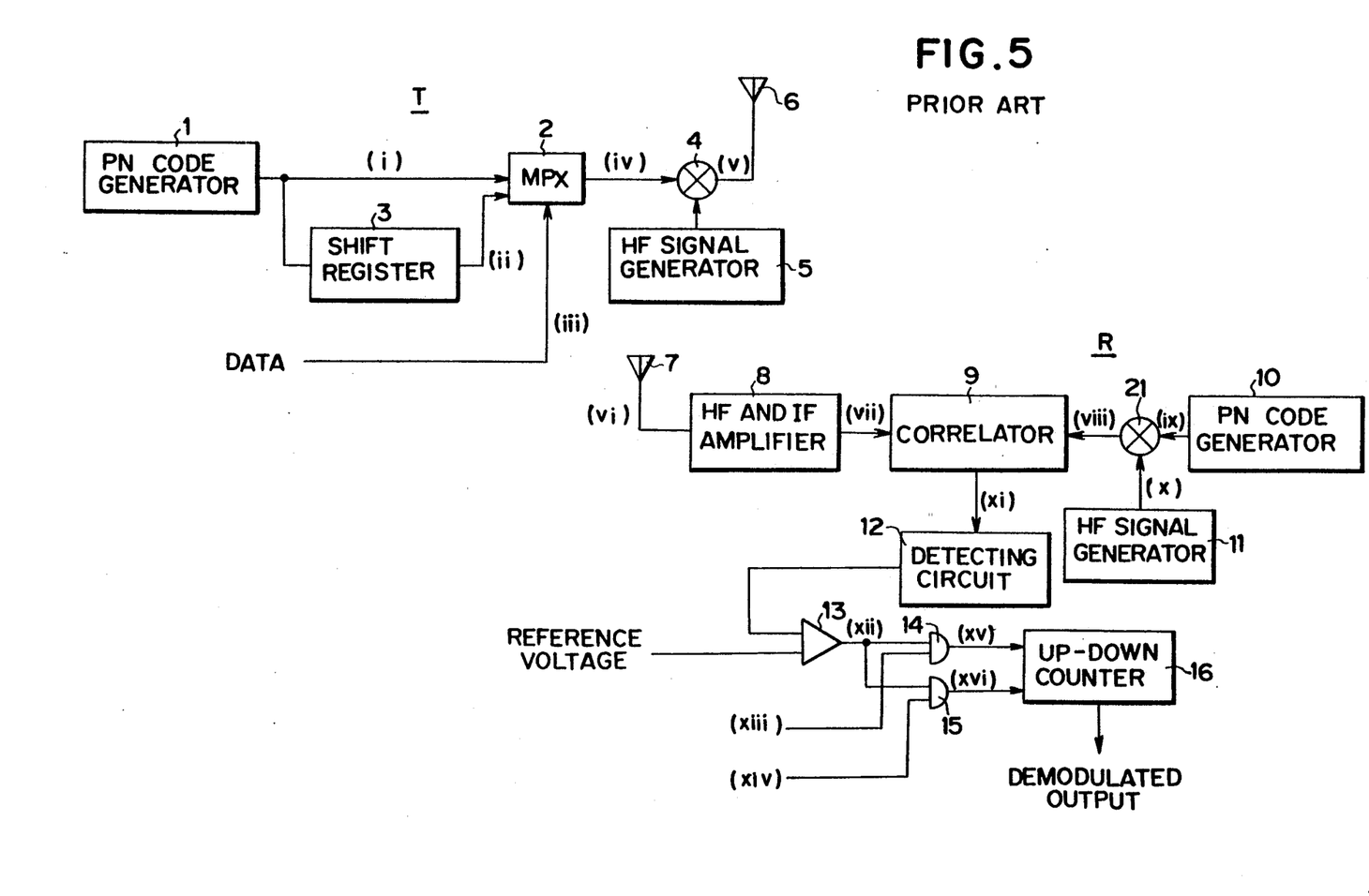
FIG. 5 is a block diagram indicating the construction of an SS communication device described in a prior patent application.

FIG. 5 is a block diagram indicating a device for realizing the SS communicating method according to the invention disclosed in the older application described previously, using a SAW convolver for the correlator in the receiver and CPSK for the modulation-demodulation system.

In the figure, T represents a transmitter, in which reference numeral 1 is a PN code generator; 2 is a multiplexer (MPX); 3 is a shift register; 4 is a double balanced modulator; 5 is a HF signal generator; and 6 is a transmitting antenna. On the other hand, R represents a receiver, in which reference numeral 7 is a receiving antenna; 8 is a HF amplifier-frequency converter-IF amplifier; 9 is a correlator (e.g. SAW convolver); 10 is a PN code generator; 11 is a HF signal generator; 12 is a detecting circuit; 13 is a voltage comparator; 14 and 15 are AND gates; 16 is a demodulating circuit including an up-down counter; and 21 is a double balanced modulator.

Figure 6:
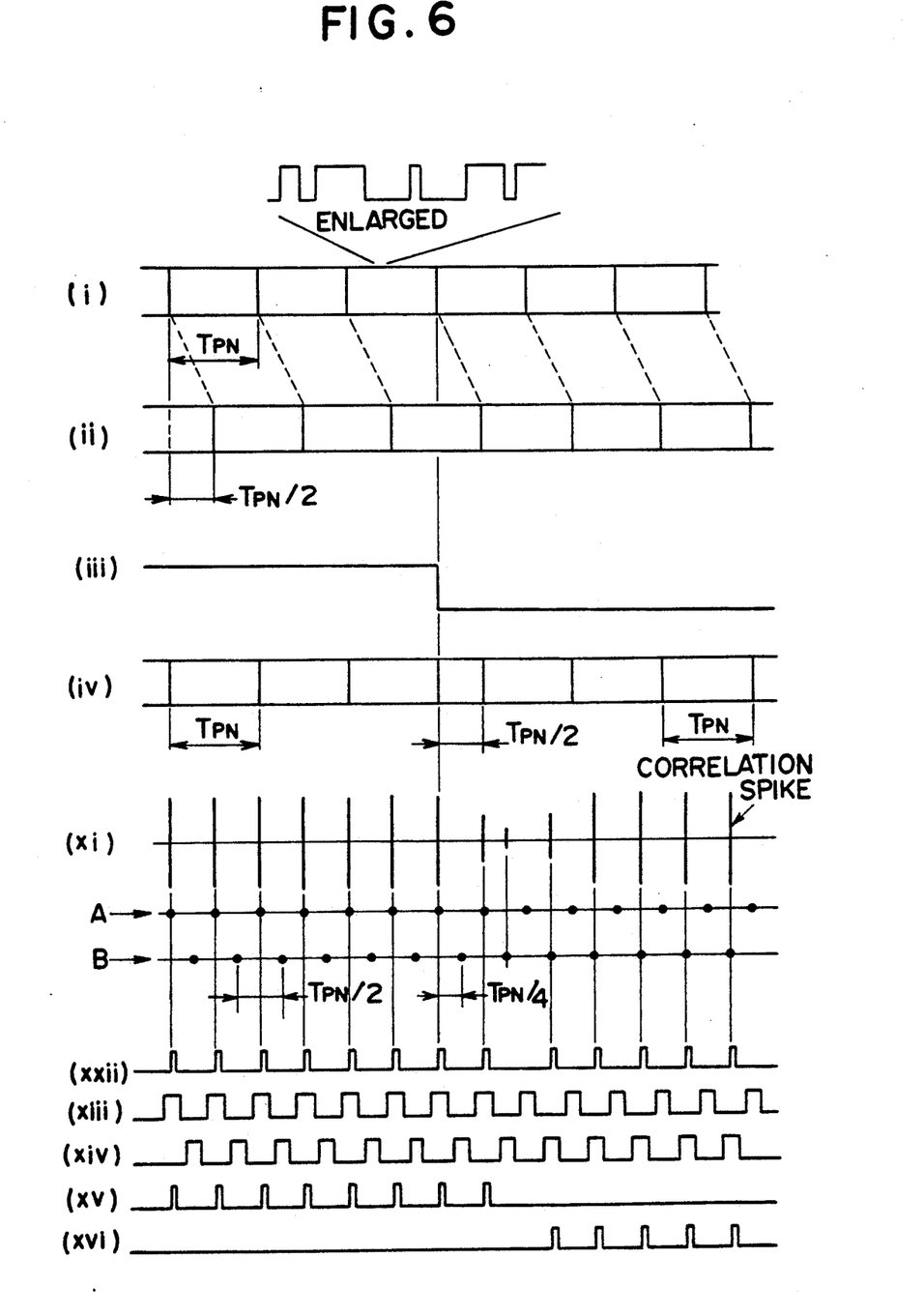
FIG. 6 shows waveforms for explaining the operation of the device indicated in FIG. 5.

In the transmitter T, as indicated in FIG. 6, the first PN code (i) having the predetermined period generated by the PN code generator 1 is inputted directly to the MPX2 and at the same time the second PN code (ii) obtained by delaying the first PN code by a predetermined phase by the shift register 3 is inputted in the MPX2. The delay amount of the first PN code by the shift register 3 is determined in accordance with the phase shift amount of the code at the CPSK demodulation. Concretely speaking, it is selected so as to be about ½ of a period of the PN code. That is, denoting one period of the PN code by $T_{PN}$, about ½$T_{PN}$ is selected for the delay amount. (ii) in FIG. 6 represents the state thereof. This is because the phase difference between the two codes (in this case PN1 and PN2) when the CPSK modulation is effected is maximum so that the number of phase judgment errors at the demodulation can be minimized, if the delay amount is selected as described above.

Data are given to the MPX2 as a control input (iii), and a PN code (iv) having a different code phase is outputted to the modulator 4 in response to these data. The modulator 4 multiplies the PN code (iv) stated above by an HF signal to output an SS modulated signal (v), which is transmitted through the antenna 6.

On the other hand, in the receiver R, a received signal (vi) coming from the antenna 7 is amplified and frequencyconverted by the circuit 8 and a signal (vii) thus obtained is inputted to one of the inputs of the correlator 9. On the other hand, a reference signal (viii) is applied to the other input of the correlator 9.

Figure 8:
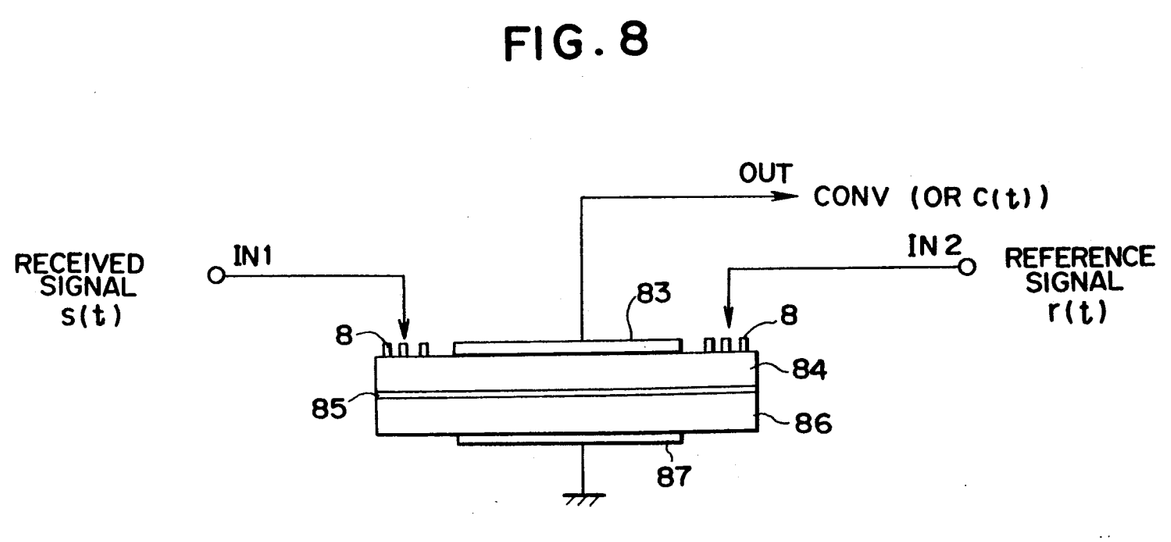
FIG. 8 is a side view of a SAW convolver used in the embodiment of FIG. 5.

This reference signal (viii) is generated by multiplying a third PN code (ix), which is inverted in time with respect to the first PN code (i) coming from the PN code generator 10, by an HF signal (x) in the modulator 21. The SAW convolver disclosed in the older application No. Hei 2-331399 described previously, as indicated in FIG. 8, can be used for the correlator 9. Here the received signal s(t) and the reference signal r(t) are received by a terminal IN1 and the other terminal IN2, respectively, and inputted thereto through interdigital transducers IDT8. 83 is a gate electrode for taking out the output; 84 is a zinc oxide (ZnO) layer; 85 is a silicon oxide ($SiO_2$) layer; 86 is a silicon (Si) layer; and 87 is an ohmic electrode. In the case where a SAW convolver is used for the correlator, since the input directions to the convolver are opposite to each other for the PN code and the reference code, one of the signals which are to be correlated with each other should be inverted in time. In this embodiment, the third PN code is inverted in time with respect to the first PN code.

Figure 7:
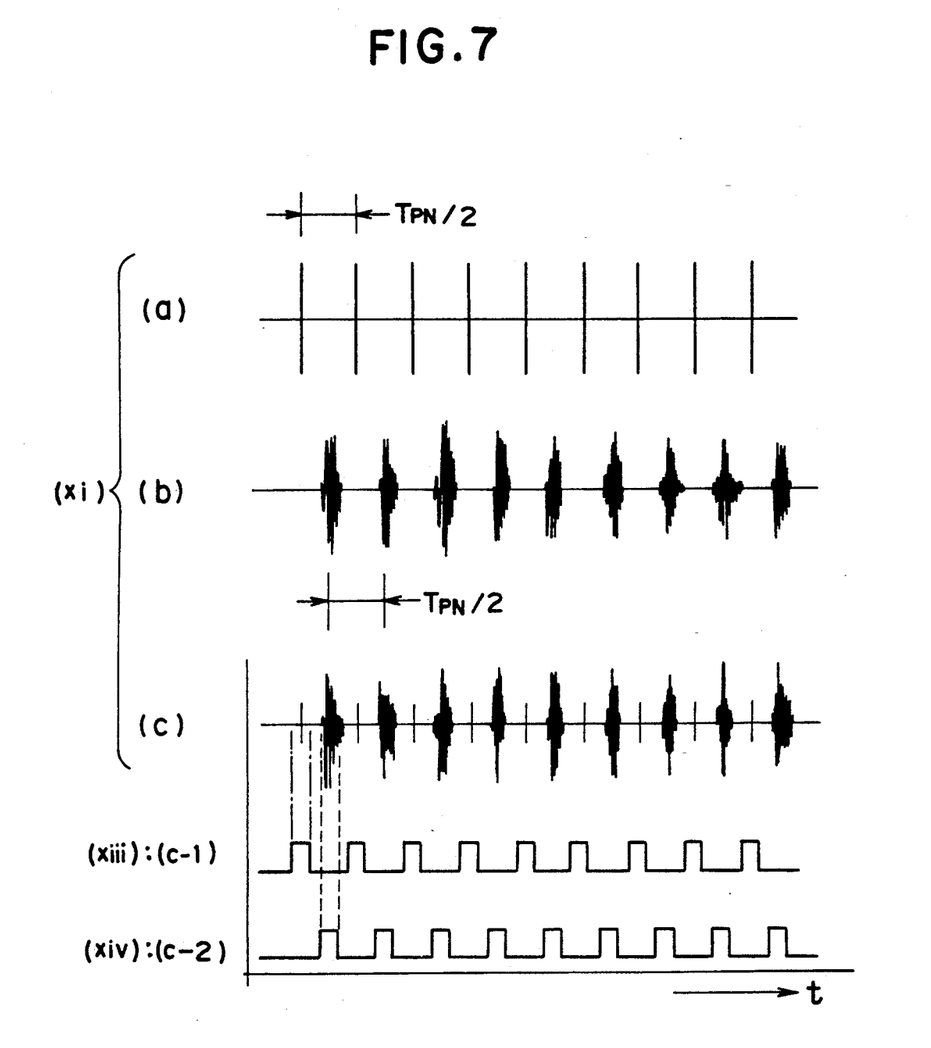
FIG. 7 is a diagram for explaining the operation of the device indicated in FIG. 5, when disturbing signals are inputted together therein.

A correlation output (xi) consisting of HF signals having a spike-shaped envelope part, as indicated in FIG. 7, is generated by the correlator 9. This spike-shaped part is a self correlation peak, which is called a correlation spike, in the case where the PN code in the received signal and the PN code in the reference signal are in accordance with each other.

The generator interval between two adjacent correlation spikes, in the case where the signal is not modulated with data, is equal to ½ of the period of the PN code in the received signal (which is equal to the period of the PN code in the reference signal). On the contrary, in the case where the received signal is CPSK-modulated, as described previously, the generation interval between two adjacent correlation spikes varies, depending on the data, as indicated by (xi) in FIG. 6.

The correlation output (xi) is envelope-detected by the detecting circuit 12 and the detection output thereof is given to one of the inputs of the comparator 13. A predetermined reference voltage is inputted to the other input of the voltage comparator 13 and a binary converted correlation pulse (xii) is obtained at the output thereof.

This correlation pulse is applied to one of the inputs of each of the AND gates 14 and 15 and time window pulses (xiii) and (xiv) are applied to the other inputs, respectively, after having been generated by a burst synchronization, as indicated e.g. in the Japanese patent application No. Hei 2-331399 described previously. Therefore, the correlation pulse passes through either one of the AND gates only during a period of time where either one of the time window pulses exists and is applied to the demodulating circuit 16.

The demodulating circuit 16 up- and down-counts pulses passing through the respective gates by means of an up-down counter included therein, in order to judge during which time window more correlation pulses pass therethrough to effect the data demodulation. Further, the time window pulses described above are synchronized with the correlation output, and e.g. the burst transmission method described in the older application stated previously, i.e. patent application Hei 2-331399, may be used for the synchronizing method.

Although the system of the SS communication device disclosed in the older application described above is basically excellent, it was found that it still had problems described below when it was used in practice.

For example, in the case where a plurality of narrow band disturbing signals are mixed in a received signal, depending on the relation between these disturbing signals and the frequency used in the SS communication device, a strong disturbing correlation output appears in accordance with the generation period of correlation spikes due to the object signal, as indicated by (b) in FIG. 7. In the case where both the object signal and the disturbing signals exist, the correlation output can be as indicated by (c) in FIG. 7. In this case, although the correlation spike due to the object signal is in accordance with the time window pulse (xiii):(c-1), since the disturbing signals are in accordance with the other time window pulse (xiv):(c-2) and in addition the disturbing signals are stronger, the number of binary converted correlation pulses generated by the disturbing signals in accordance with the time window pulse (xiv) is greater. Consequently, as the result, errors are produced in the demodulation by the up-down count of the correlation pulses described above.

OBJECT OF THE INVENTION

The object of the present invention is to provide a construction of the SS communication device using the CPSK modulation-demodulation system which is capable of suppressing demodulation errors as much as possible, even if a plurality of narrow band disturbing signals are mixed.

SUMMARY OF THE INVENTION

In order to achieve the above object, an SS communication device of a first embodiment according to the present invention is characterized in that it includes:

a transmitter comprising:

first PN code generating means for generating a first PN code having a predetermined period;

second PN code generating means for generating a second PN code obtained by delaying said first PN code by a predetermined phase;

modulating means for generating an SS modulated output by selecting either one of said first and said second PN codes according to an exclusive logic sum of data to be transmitted and disturbing signals; and transmitting means for transmitting said SS modulated output; and a receiver comprising:

correlating means for generating a correlation output between a received signal and a reference signal produced by a third PN code, which is inverted in time with respect to said first PN code;

timing means for generating a first time window pulse, a second time window pulse obtained by delaying said first time window pulse by a predetermined phase, and a control signal having a predetermined period and synchronized with said correlation output;

binary converting means for outputting a correlation pulse obtained by binary converting said correlation output;

first and second gate means, to which said correlation pulse is applied;

switching means for switching said first and said second time window pulse in response to said control signal, to apply either one of them to said first and second gate means; and demodulating means for up- and down-counting output pulses of said first and said second gate means, respectively, to demodulate said data, starting from a count output thus obtained.

Further, an SS communication device of a second embodiment according to the present invention is characterized in that it includes:

a transmitter comprising:

first PN code generating means for generating a first PN code having a predetermined period;

second PN code generating means for generating a second PN code obtained by delaying said first PN code by a predetermined phase;

modulating means for generating an SS modulated output by selecting either one of said first and said second PN codes according to an exclusive logic sum of data to be transmitted and disturbing signals; and transmitting means for transmitting said SS modulated output; and a receiver comprising:

correlating means for generating a correlation output between a received signal and a reference signal produced by a third PN code, which is inverted in time with respect to said first PN code;

timing means for generating a first time window pulse, a second time window pulse obtained by delaying said first time window pulse by a predetermined phase, and a control signal having a predetermined period and synchronized with said correlation output;

binary converting means for outputting a correlation pulse obtained by binary converting said correlation output;

first and second gate means, to which said correlation pulse as well as said first and said second time window pulses, respectively, are applied;

switching means for switching output pulses of said first and said second gate means in response to said control signal, to output either one of them; and demodulating means for up- and down-counting the output pulses of said switching means to demodulate said data, starting from a count output thus obtained.

In the SS communication device according to the present invention, the transmitter selects either one of the two PN codes having the same pattern and different generation timing by using an exclusive logic sum of data and disturbing signals to effect spread-spectrum-modulation of and to transmit the selected signal.

In the receiver, after having obtained correlation pulses by binary converting the correlation output, these correlation pulses are separated into two groups by using two time window pulses synchronized with a correlation output (disturbing signals) and the data are demodulated, starting from an up-count value and a down-count value of the groups of pulses thus separated.

DETAILED DESCRIPTION

Hereinbelow an embodiment of the present invention shown in the drawings will be explained.

Figure 1:
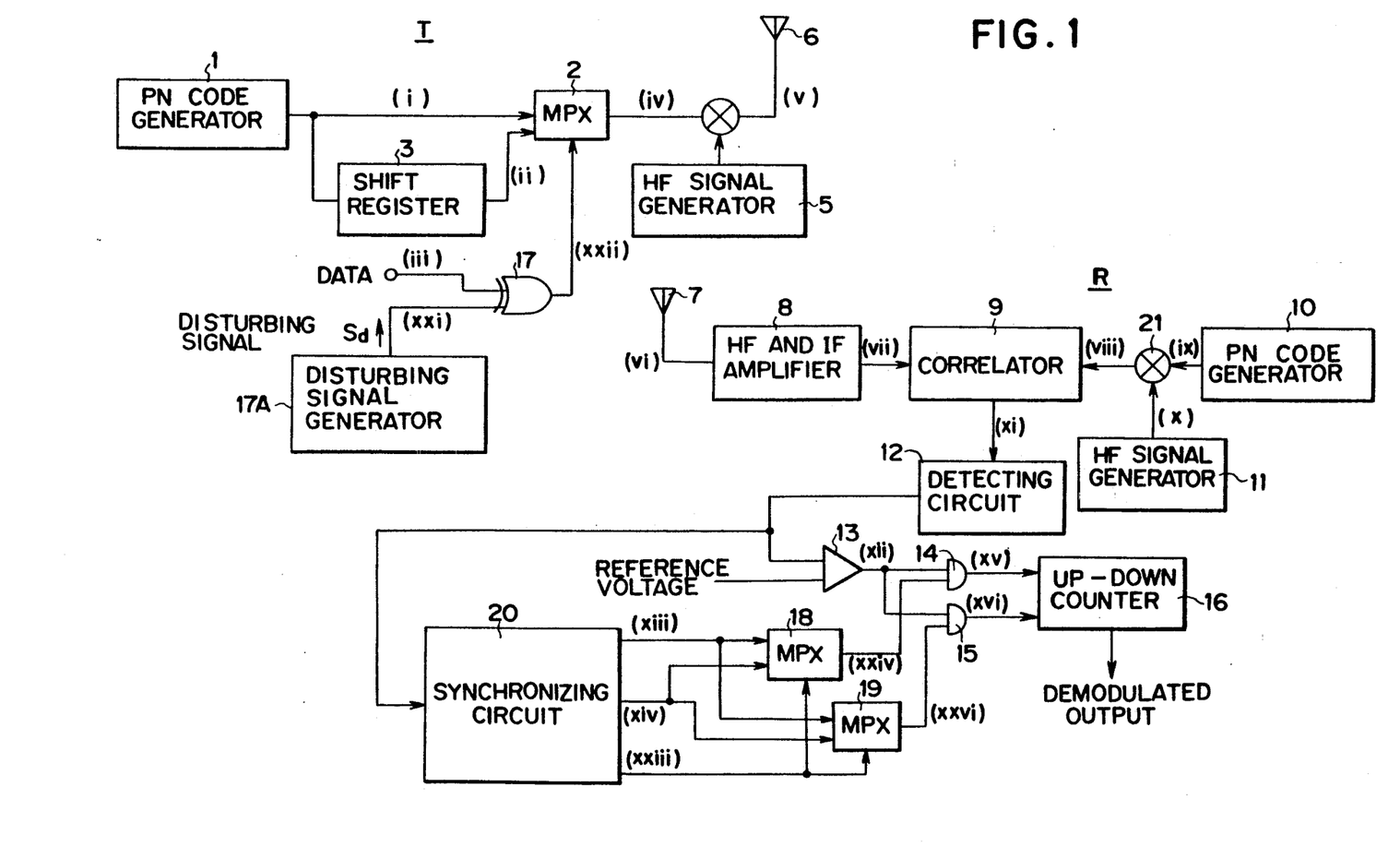
FIG. 1 is a block diagram depicting an embodiment of the SS communication device according to the present invention.

FIG. 1 shown an embodiment of the transmitter T and the receiver R in an SS communication device according to the present invention, in which the same reference numerals as those used in FIG. 5 represent circuits identical or similar to those indicated therein.

Figure 2:
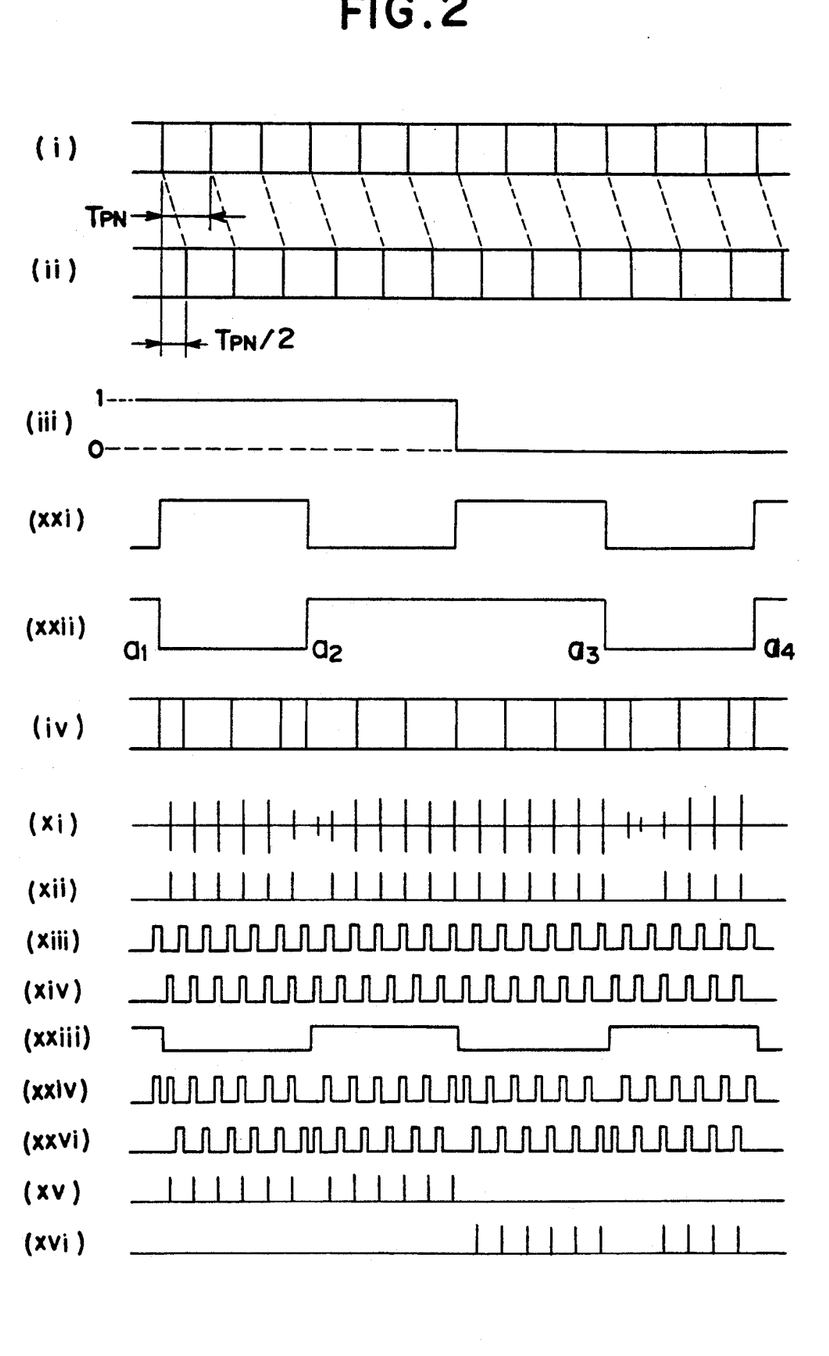
FIG. 2 shows waveforms for explaining the operation of the embodiment indicated in FIG. 1.

In the transmitter T in FIG. 1, what is particularly different from the transmitter T indicated in FIG. 5 is that there is provided an exclusive logic sum (EOR) circuit 17 for data (iii) and a disturbing signal (xxi) shown in FIG. 2. The exclusive logic sum output thereof is applied to the MPX2 as a control input. The disturbing signal (xxi) is generated by a disturbing signal generator 17A in the form of a pulse train having a predetermined period. That is, in this transmitter T, comparing it with the system disclosed in the above-mentioned prior application, the CPSK modulation is effected on the basis of the exclusive logic sum of the data and the disturbing signal.

Now the reason why the exclusive logic sum of the data and the disturbing signal is explained. Although it is conceivable that the disturbing signal is a pulsed signal having a predetermined period as an example, as indicated by (xxi) in FIG. 2, it is not restricted thereto, but any signal may be used therefor, if it is synchronized with a control signal (xii) on the receiver side described later.

The data to be transmitted (iii) are two-valued data composed of 0 and 1, and the output of the EOR gate, when a similar logic is adopted also for the disturbing signal, is as indicated in the following table:

| Data to be transmitted (iii) | Disturbing signal (xxi) | Output (xxii) |
| --- | --- | --- |
| 1 | 0 | 1 |

-continued

| Data to be transmitted (iii) | Disturbing signal (xxi) | Output (xxii) |
| --- | --- | --- |
| 0 | 1 | 1 |
| 0 | 0 | 0 |
| 1 | 1 | 0 |

The output signal (xxii) is inputted to the MPX2 and on the basis thereof either one of the first PN code (i) and the second PN code (ii) is selected. The signal thus selected is the output signal (iv) of the MPX2 and the HF signal from the HF signal generator is modulated therewith. On the receiver side, a signal corresponding to the signal (xxii) is obtained by demodulating this signal (iv) and the data to be transmitted are demodulated by using a control signal (xxiii) together therewith. (In other words, since there is a combination of the disturbing signal (xxi) and the control signal (xxiii), which are synchronized between the transmitter side and the receiver side, electromagnetic waves transmitted by the transmitter should be not always modulated, reflecting the data to be transmitted (iii)).

That is, on the receiver side, the data are demodulated by using the received signal and the control signal (synchronized with the correlation output). Expressing it by using the above table, the signal (iii) is demodulated, starting from the signals (xxii) and (xxi). In other words, the data to be transmitted should be modulated with such a logic that the signal (iii) is determined unequivocally by the signals (xxii) and (xxi). Consequently, although, the EOR gate is used in the present embodiment, the invention is not restricted thereto, but any logic may be used if is a two-input-one-output logic and one of the inputs is determined unequivocally by the output and the other input. A multiplier in the case where logic for the data and the disturbing signals is composed of 1 and $-1$ can be cited as an example of such a logic. The logic in this case is as indicated in the following table:

| Input 1 | Input 2 | Output |
| --- | --- | --- |
| 1 | 1 | 1 |
| 1 | $-1$ | $-1$ |
| $-1$ | 1 | $-1$ |
| $-1$ | $-1$ | 1 |

Figure 1A:
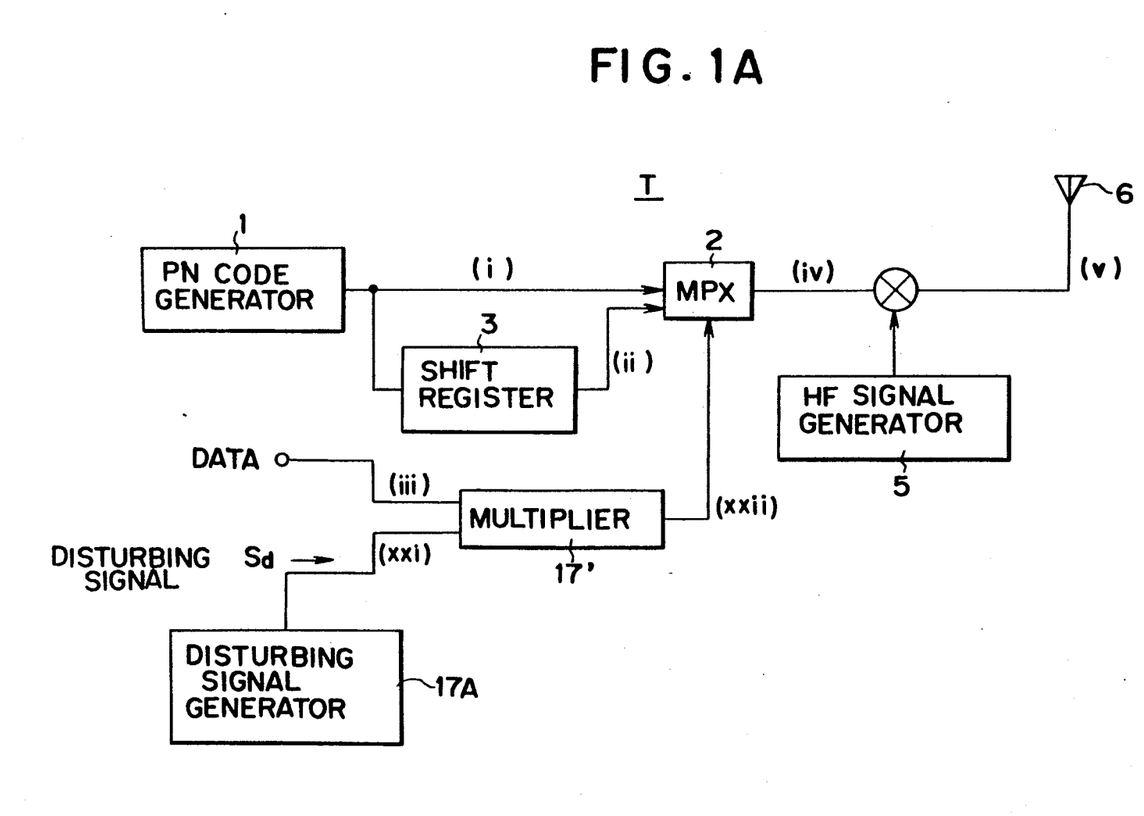
FIG. 1A is a block diagram depicting a variation of the transmitter indicated in FIG. 1.
Figure 2A:
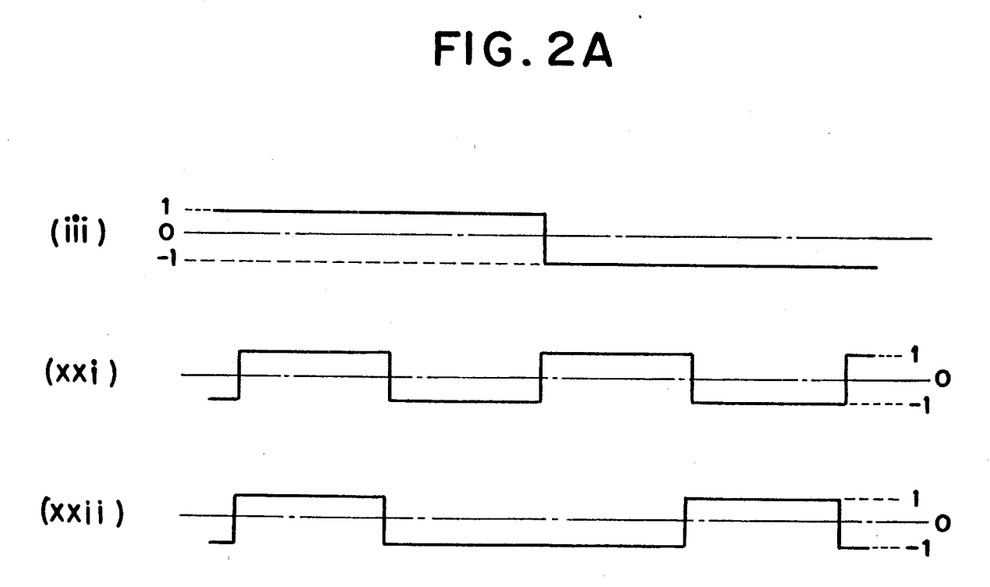
FIG. 2A shows waveforms for explaining the operation of the transmitter indicated in FIG. 1A.

Further the principal parts of the block diagram and the timing chart are as indicated in FIGS. 1A and 2A. On the other hand, what is particularly different from the receiver R indicated in FIG. 5 is that multiplexers (MPX) 18 and 19, to which the time window pulses (xiii) and (xiv) are applied, are disposed so that they are controlled by a control signal (xxiii) having a predetermined period and synchronized with the correlation output, the control signal (xxiii) being generated by a synchronizing circuit 20. In this way MPX outputs (xxiv) and (xxvi) are obtained, depending on the polarity of this control signal, as indicated in FIG. 2 and in the following table.

| Control Signal | MPX | |
| --- | --- | --- |
| (xxiii) | (xxiv) | (xxvi) |
| 1 | (xiii) | (xiv) |
| 0 | (xiv) | (xiii) |

Figure 3:
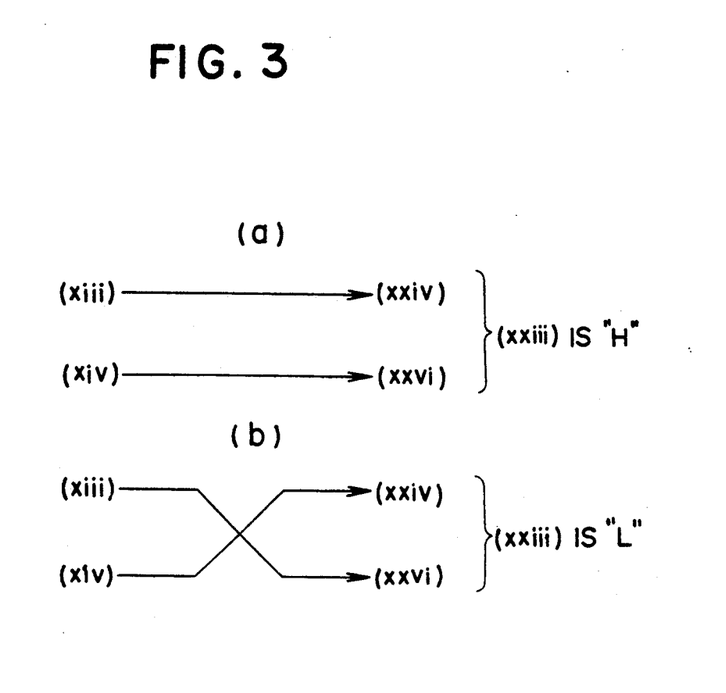
FIG. 3 is a diagram for explaining the operation of the MPX in the embodiment of FIG. 1.

That is, the MPXs 18 and 19 realize the connection expressed by (a) or (b) in FIG. 3, depending on the control signal (xxiii). Further, the time window pulses (xiii) and (xiv) as well as the control signal (xii) should be synchronized with the correlation output. This is realized by the synchronizing circuit 20. For example, they can be synchronized by utilizing the burst portion described in one of the prior applications, i.e. Japanese patent application No. Hei 2-331399. So long as the synchronization is realized by using the burst portion, the disturbing signal (xxi) on the transmitter side and the controlling signal (xxiii) on the receiver side are used.

Next, the reason why influences due to a disturbance can be reduced by the method described above according to the present invention is explained.

As described above, the problem in the case where a plurality of disturbing signals are mixed in the received signal results from the fact that the disturbing component in the correlation output is continuously in accordance with the generation timing of either one of the time window pulses (xiii) and (xiv), within one bit. Therefore, if the CPSK modulation is effected by the disturbing signals also within one data bit so that the generation timing of the correlation spike due to the object signal is varied, as by the method according to the present invention, since the generation timing of the disturbing component is not varied, as the result is that the continuous accordance described above can be avoided.

In the embodiment described above this is achieved by effecting the CPSK modulation with the exclusive logic sum of the data and the disturbing signals.

That is, the correlation spike due to the object signal is generated with a timing corresponding to "1" of the data or with a timing corresponding to "0", so as to be disturbed in this way. In the receiver R, the disturbance is cancelled by setting the timing at this disturbance and switching the time window pulses by using the control signal (xxiii), i.e. the data are demodulated by making the switching of the time window pulses by the disturbance identical to the switching on the transmitter side.

Although the time window pulses are switched in the above embodiment, it is clear that equivalent operation can be realized if the switching is effected by the pulses after having passed through the time windows, i.e. the outputs of the AND gates 14 and 15.

Figure 4:
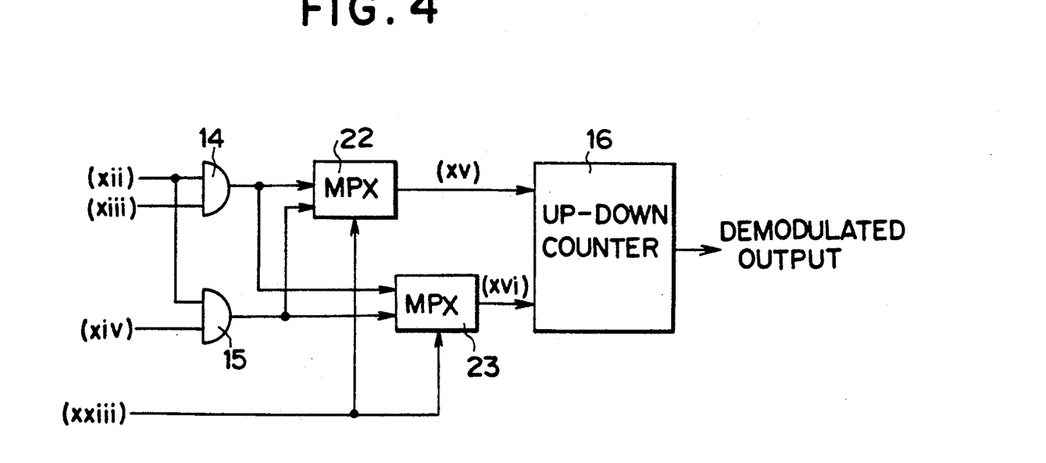
FIG. 4 is a block diagram indicating a variation of the embodiment of FIG. 1.

FIG. 4 indicates this variation, in which there are further MPXs 22 and 23 on the output side of the AND gates 14 and 15 and the switching control of these MPXs is effected by using the control signal (xxiii).

As explained above, according to the present invention, even if a plurality of narrow band disturbing signals are mixed in the received signal, it is possible to decrease generation of demodulation errors. Further, since the device according to the present invention can be realized with only slight modifications to the basic digital circuit for the CPSK modulation-demodulation method, it is suitable for fabricating semiconductor devices in the form of ICs. As the result, it is possible to realize a cheap SS communication device having an excellent antidisturbance property.

Figure 1B:
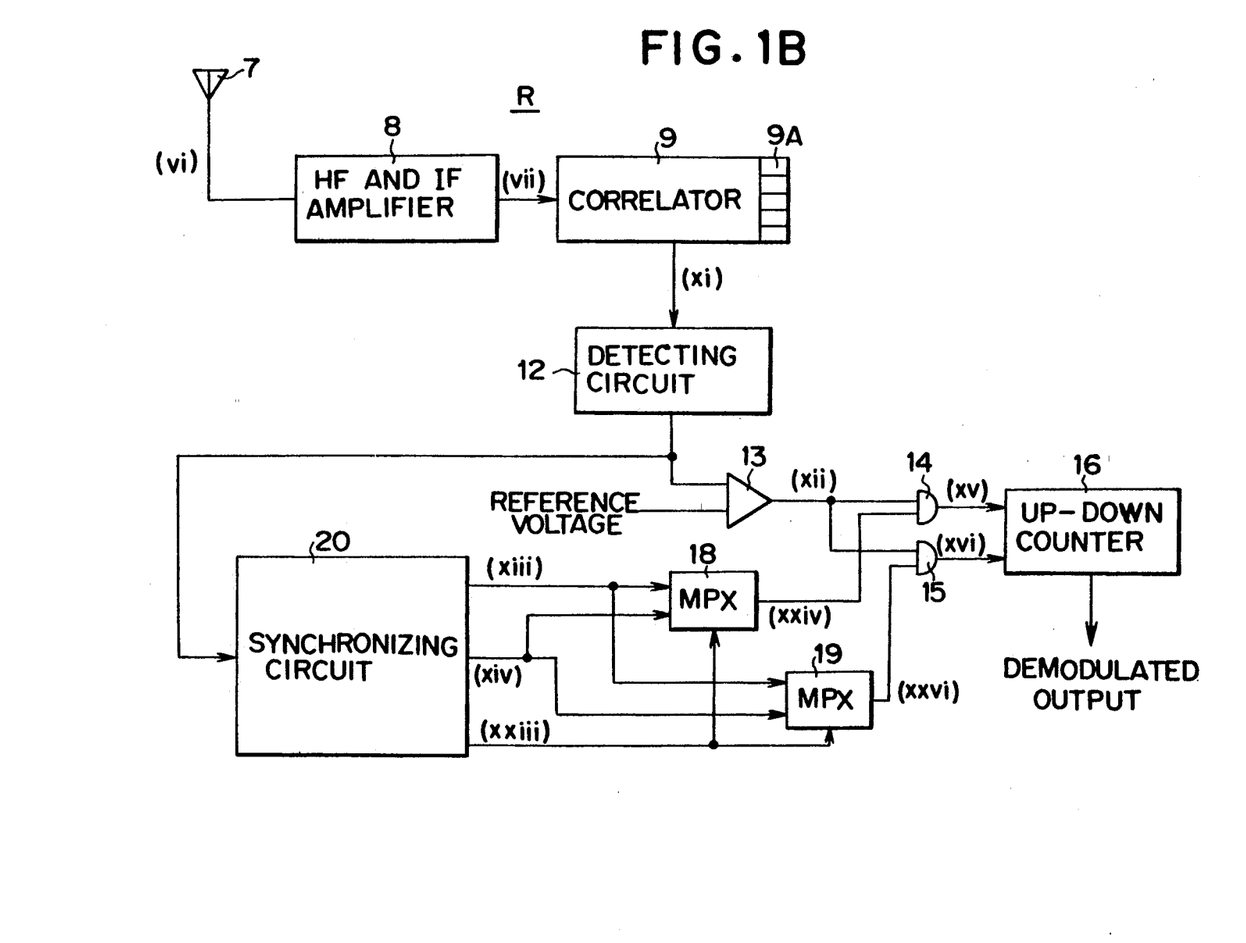
FIG. 1B is a block diagram depicting a variation of the receiver indicated in FIG. 1.

Further, since code phase modulation of SS codes is effected not only with data but with the exclusive logic sum of the data and disturbing signals independent therefrom, it can be also cited as a secondary result that the secrecy can be improved. It is clear that a greater effect to improve the secrecy can be obtained if the disturbing signals are not simple rectangular waves as described in the above explanation, but are e.g. PN codes as used for the SS code. Furthermore, although in the above embodiment the device is so constructed that the disturbing signals are generated by the independent disturbing signal generator 17A, it is possible also to use pulses generated by the PN code generator 1 and subjected to some processing. Still further, the different circuit elements used in the embodiments described above are not restricted to those described above. For example, a matched filter may be used for the correlator 9 on the receiver side. In this case, the code corresponding to (viii) in FIG. 1 is fixed and since it is stored in a filter as 9A, the PN code generator, etc. (10, 11 and 21 in FIG. 1) are unnecessary, as indicated in FIG. 1B.

What is claimed is:

1. A spread spectrum communication device comprising:
   a transmitter which includes:
   first PN code generating means for generating a first PN code having a predetermined period;
   second PN code generating means for generating a second PN code obtained by delaying said first PN code by a predetermined phase;
   modulating means for generating a spread spectrum modulated output by selecting one of said first and said second PN codes according to an exclusive logic sum of data to be transmitted and disturbing signals; and
   transmitting means for transmitting said spread spectrum modulated output; and
   a receiver which includes:
   SAW convolver means for generating a correlation output between a received signal and a reference signal produced by a third PN code, which is inverted in time with respect to said first PN code;
   timing means for generating a first time window pulse, a second time window pulse obtained by delaying said first time window pulse by a predetermined phase, and a control signal having a predetermined period and synchronized with said correlation output;
   binary converting means for outputting a correlation pulse obtained by binary converting said correlation output;
   first and second gate means to which said correlation pulse is applied;
   switching means for switching said first and said second time window pulses in response to said control signal, to apply a selected one of them to each of said first and second gate means; and
   demodulating means for up counting and down-counting output pulses of said first gate means and said second gate means, respectively, to demodulate said data, starting from a count output thus obtained.

2. A spread spectrum communication device comprising:
   a transmitter which includes:
   first PN code generating means for generating a first Pn code having a predetermined period;
   second PN code generating means for generating a second PN code obtained by delaying said first PN code by a predetermined phase;
   modulating means for generating a spread spectrum modulated output by selecting one of said first and said second PN codes according to an exclusive logic sum of data to be transmitted and disturbing signals; and
   transmitting means for transmitting said spread spectrum modulated output; and
   a receiver which includes:
   SAW convolver means for generating a correlation output between a received signal and a reference signal produced by a third PN code, which is inverted in time with respect to said first PN code;
   timing means for generating a first time window pulse, a second time window pulse obtained by delaying said first time window pulse by a predetermined phase, and a control signal having a predetermined period and synchronized with said correlation output;
   binary converting means for outputting a correlation pulse obtained by binary converting said correlation output;
   first and second gate means to which said correlation pulse as well as said first and said second time window pulses, respectively, are applied;
   switching means for switching output pulses of said first and said second gate means in response to said control signal, to output each from a respective one of two outputs of said switching means; and
   demodulating means for up-counting and down-counting the output pulses respectively from the two outputs of said switching means to demodulate said data, starting from a count output thus obtained.

3. A spread spectrum communication device comprising:
   a transmitter which includes:
   first PN code generating means for generating a first PN code having a predetermined period;
   second PN code generating means for generating second PN the code obtained by shifting a code generated by said first PN code generating means by a predetermined phase difference;
   converting means for converting a polarity of an information signal to be transmitted according to a predetermined signal and a predetermined rule, said converting means being so constructed that the polarity of said information signal to be transmitted can be determined, based on an output thereof and said predetermined signal;
   selecting means for selecting one of said first and said second PN codes according to said information signal whose polarity is converted; and
   transmitting means for spread-spectrum-modulating a PN code thus selected and for transmitting it; and
   a receiver comprising:
   receiving means for receiving a spread-spectrum-modulated wave transmitted by said transmitter;
   correlating means for correlating a signal received by said receiving means with a predetermined reference signal to generate a correlation output;
   timing means for generating a first time window pulse having a predetermined period and synchronized with said correlation output, a second time window pulse obtained by delaying said first time window pulse by a predetermined phase difference, and a control signal having a predetermined period and synchronized with said correlation output coming from said correlation means;
   binary converting means for outputting a correlation pulse obtained by binary converting said correlation output;
   switching means for switching correlation pulses generated by said binary converting means by making them correspond at two outputs of said switching means respectively to one of said first and second time window pulses in response to said control signal; and demodulating means for up- and down-counting output pulses outputted by the respective outputs of said switching means to demodulate said information signals, starting from a count output thus obtained.

4. A spread spectrum communication device according to claim 3, wherein said second PN code generating means is a shift register which delays pulses generated by said first PN code generating means by said predetermined phase difference.

5. A spread spectrum communication device according to claim 4, wherein said predetermined phase difference corresponds to ½ of the period of said first PN code.

6. A spread spectrum communication device according to claim 1, wherein said switching means comprises a first gate circuit and a second gate circuit to which said correlation pulse is inputted, and a multiplexer which switches said first and said second time window pulses according to said control signal to input a respective one of them to each of said first and said second gate circuits.

7. A spread spectrum communication device according to claim 1, wherein said switching means comprises gate circuits to which said correlation pulse is inputted and to which said first and said second time window pulses are respectively inputted, and means for switching outputs of said first and said second gate circuits in response to said control signal.

8. A spread spectrum communication device according to claim 1, wherein said correlating means is a SAW convolver.

9. A spread spectrum communication device according to claim 1, wherein said correlating means is a matched filter.

10. A spread spectrum communication device according to claim 3, wherein said information signal to be transmitted and said predetermined signal are composed of two values of 0 and 1, and said converting means is an exclusive logic sum circuit which is so constructed that said information signal to be transmitted is inputted to one of two inputs thereof and said predetermined signal is inputted to the other.

11. A spread spectrum communication device according to claim 3, wherein said information signal to be transmitted and said predetermined signal are composed of two values of 1 and −1, and said converting means is an exclusive logic sum circuit which is so constructed that said information signal to be transmitted is inputted to one of two inputs thereof and said predetermined signal is inputted to the other.

12. A spread spectrum communication device comprising:

a transmitter which includes:

a first PN code generating circuit, for generating a first PN code having a predetermined period;

a shift register for generating a code obtained by delaying the code generated by said first PN code generating circuit by a predetermined phase difference;

a converting circuit for converting a polarity of an information signal to be transmitted by forming an exclusive logic sum thereof with a predetermined signal;

a multiplexer for selecting one of said first PN code and an output of said shift register circuit according to said information signal whose polarity is converted; and a transmitting circuit for spread-spectrum-modulating the output of said multiplexer and for transmitting it; and a receiver which includes:

a receiving circuit for receiving the spread-spectrum-modulated wave transmitted by said transmitter;

a SAW convolver for correlating a signal received by said receiving circuit with a predetermined reference signal to generate a correlation output;

a synchronizing circuit for generating a first time window pulse having a predetermined period and synchronized with said correlation output, a second time window pulse obtained by delaying said first time window pulse by a predetermined period and synchronized with said correlation output oncoming from said convolver;

a voltage comparator for generating a binary-converted correlation pulse by comparing said correlation output with a voltage having a predetermined value;

a switching circuit for switching said correlation pulse generating by said voltage comparator in response to said control signal while making it correspond to one of said first and said second time window pulses; and demodulating means for up-counting and down-counting output pulses outputted by said switching circuit and respectively corresponding to said first and second time window pulses to demodulate said information signal, starting from a count output thus obtained.

* * * * *

UNITED STATES PATENT AND TRADEMARK OFFICE
CERTIFICATE OF CORRECTION

PATENT NO.   :   5 278 864
DATED        :   January 11, 1994
INVENTOR(S)  :   Masaharu MORI et al It is certified that error appears in the above-identified patent and that said Letters Patent is hereby corrected as shown below:

```
Column  9, line 51; change "up counting" to
                            ---up-counting---.
           line 60; change "Pn" to ---PN---.
Column 10, line 35; change "second PN the code" to
                            ---the second PN code---.
Column 11, line  2; before "sec-" insert ---said---.
Column 12, line 34; before "predetermined" insert
                            ---predetermined phase difference,
                              and a control signal
                              having a---.
           line 35; delete "on-".
           line 42; change "generating" to
                            ---generated---.
```

Signed and Sealed this

Thirty-first Day of May, 1994

Attest:

BRUCE LEHMAN

*Attesting Officer*   *Commissioner of Patents and Trademarks*